United States Patent
Hyman et al.

(10) Patent No.: US 9,854,729 B2
(45) Date of Patent: Jan. 2, 2018

(54) SEED PLANTER USING AIR PROPULSION

(71) Applicant: Brooklyn Bridge to Cambodia, Inc., Brooklyn, NY (US)

(72) Inventors: Todd M. Hyman, Phnom Penh (KH); Bunika San, Phnom Penh (KH)

(73) Assignee: Brooklyn Bridge to Cambodia, Inc., Brooklyn, NY (US)

(*) Notice: Subject to any disclaimer, the term of this patent is extended or adjusted under 35 U.S.C. 154(b) by 88 days.

(21) Appl. No.: 14/926,302

(22) Filed: Oct. 29, 2015

(65) Prior Publication Data
US 2017/0118904 A1    May 4, 2017

(51) Int. Cl.
| | | |
|---|---|---|
| A01C 7/08 | (2006.01) | |
| A01C 15/04 | (2006.01) | |
| A01C 21/00 | (2006.01) | |
| B65G 53/04 | (2006.01) | |
| A01C 15/00 | (2006.01) | |

(52) U.S. Cl.
CPC ............. *A01C 7/082* (2013.01); *A01C 7/081* (2013.01); *A01C 7/084* (2013.01); *A01C 15/00* (2013.01); *A01C 15/04* (2013.01); *A01C 21/00* (2013.01); *B65G 53/04* (2013.01)

(58) Field of Classification Search
USPC ........... 239/76, 664, 655, 566; 172/378, 379
See application file for complete search history.

(56) References Cited

U.S. PATENT DOCUMENTS

| | | | | |
|---|---|---|---|---|
| 1,058,752 | A * | 4/1913 | Johnson ................. | A01C 15/04 239/158 |
| 1,786,100 | A * | 12/1930 | Ward ....................... | A01C 7/18 111/18 |
| 2,237,229 | A * | 4/1941 | Johnson ................ | A01M 9/003 239/655 |
| 2,283,805 | A * | 5/1942 | Gustafson ............. | A01M 9/003 209/285 |

(Continued)

FOREIGN PATENT DOCUMENTS

| | | |
|---|---|---|
| EP | 376755 A1 | 7/1990 |
| JP | H08-154430 A | 6/1996 |

(Continued)

OTHER PUBLICATIONS

Search Report dated Dec. 14, 2016, issued in Singapore Application No. 102015089535.

(Continued)

*Primary Examiner* — Alicia Torres
(74) *Attorney, Agent, or Firm* — Covington & Burling LLP; Enrique D. Longton; Grant D. Johnson

(57) ABSTRACT

An air-powered device that propels seed from a storage container and distributes seeds from a horizontal tube into a series of vertical tubes, and shoots the seeds from those vertical tubes into the ground. The device can be carried by a human user or mounted on a cart having wheels or skis, and towed through a field while being used to plant seed. The different methods of carrying and operating the device enable farmers to utilize the device in different types of terrain and during different condition. The device can be (Continued)

manufactured from common, affordable materials, such as PVC, and offers rural farmers a portable solution for planting their crops that is efficient and low-cost.

37 Claims, 10 Drawing Sheets

(56) References Cited

U.S. PATENT DOCUMENTS

| | | | | |
|---|---|---|---|---|
| 2,388,798 A | * | 11/1945 | Parker | A01M 9/0076 239/655 |
| 2,538,456 A | * | 1/1951 | Howe, Jr. | B27G 19/06 83/440.2 |
| 2,687,593 A | * | 8/1954 | Edwards | A01M 9/003 15/312.2 |
| 3,567,120 A | * | 3/1971 | Suda | A01C 15/04 239/152 |
| 4,029,238 A | | 6/1977 | Jalas | |
| 4,300,461 A | | 11/1981 | Hodge et al. | |
| 4,519,548 A | * | 5/1985 | Farmer | A01C 15/02 239/652 |
| 5,673,638 A | * | 10/1997 | Keeton | A01C 5/068 111/167 |
| 2012/0042813 A1 | | 2/2012 | Liu et al. | |
| 2014/0373358 A1 | * | 12/2014 | Bermes | B62D 21/20 29/897.2 |

FOREIGN PATENT DOCUMENTS

| | | | | |
|---|---|---|---|---|
| JP | 2009-100690 A | | 5/2009 | |
| MY | WO 2009072858 A1 | * | 6/2009 | A01C 7/081 |

OTHER PUBLICATIONS

Written Opinion dated Dec. 14, 2016, issued in Application No. 10201508953S.

* cited by examiner

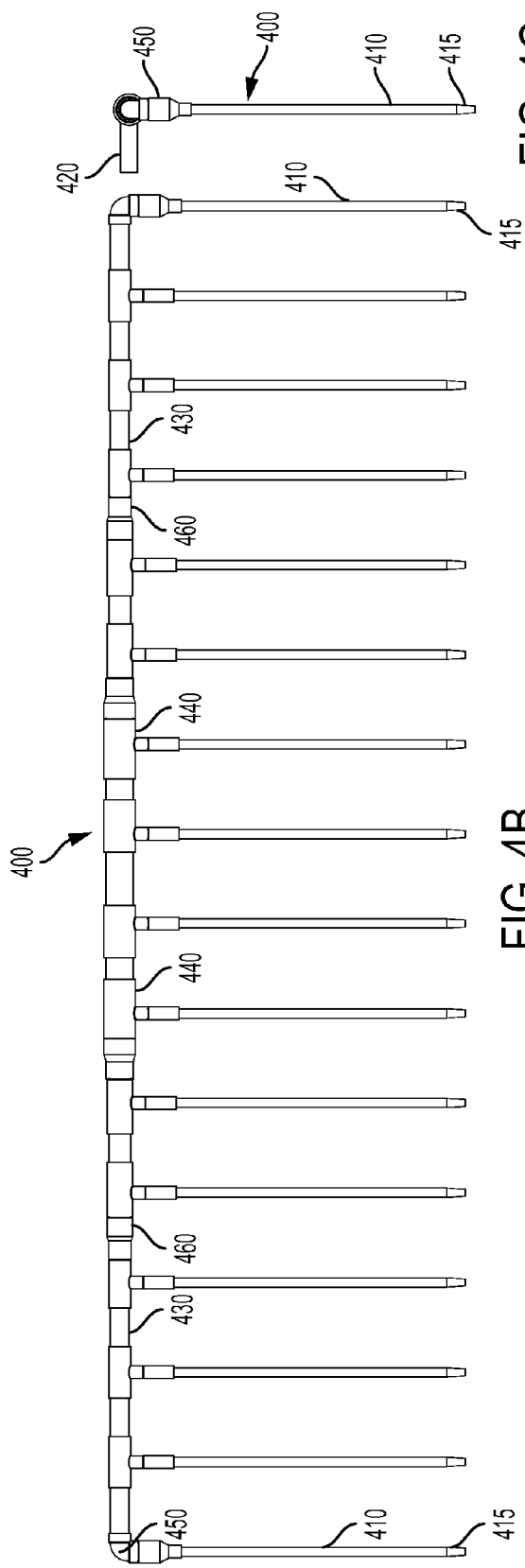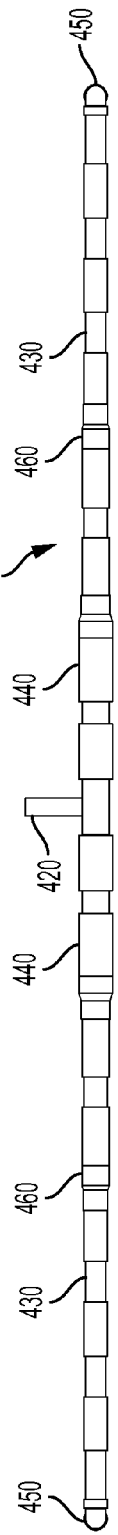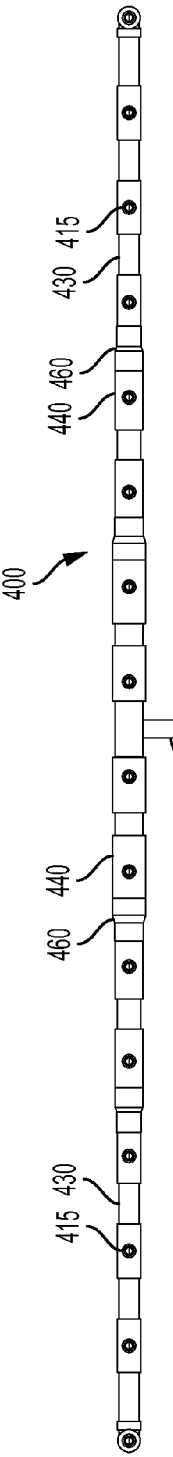

SEED PLANTER USING AIR PROPULSION

TECHNICAL FIELD

The present invention pertains to devices, systems, and methods for planting seeds, as well as to methods of manufacturing such devices and systems. More particularly, the present invention is directed to: a) devices comprising a storage container, an air propulsion apparatus, and a hollow horizontal member and a plurality of hollow vertical members; b) systems comprising a storage container, an air propulsion apparatus, and a hollow horizontal member and a plurality of hollow vertical members; and c) methods of manufacturing or using such devices and systems.

BACKGROUND OF THE INVENTION

In rural areas of the developing world, many people remain mired in poverty and dependent upon small subsistence level farms as their only source of food. These subsistence farmers, reliant on their harvests to feed themselves and their families, lack the agricultural equipment needed to increase the productivity of their harvests. The low productivity of these subsistence farms means that farmers are unable to grow any surplus of food that could be sold at the market place, preventing these farmers from earning the income that would allow them to invest in their farms, purchase healthcare and education for their families, and progress out of poverty towards the middle class.

Cambodia, one of the poorest countries in Asia, presents a vivid illustration of the plight faced by Third World subsistence farmers. Plagued by decades of conflict, nearly eighty percent of Cambodia's population lives in rural areas, with many relying on farming as their only source of food and income. Rice is the primary crop of Cambodian farmers. To ensure the optimal spacing of the rice plants and to facilitate weeding and the application of fertilizers, herbicides, or insecticide, rice is grown in rows, which results in greater crop yields for the rice than growing the crop in other patterns.

In a traditional Cambodian method for rice-farming, farmers plant rice in one or more smaller plots for a certain period of time, and then transplant the seedlings by hand to the main field for maturation once those seedlings have grown to a sufficient size. In contrast, in more developed countries where farming is more machine-intensive and industrialized, automated equipment capable of mechanically planting and cultivating rice in rows is commonly utilized, replacing the traditional hand-transplantation techniques used by rural farmers in Cambodia and other Southeast Asian countries.

Unlike the more industrialized farming sectors in other nations, the relative lack of income and resources of many Cambodian farmers means that automated equipment for planting rice crops is largely unavailable to these farmers. This means that these farmers must employ human labor to plant their rice crops using the traditional Cambodian method. This method is very labor intensive, as the traditional method can take up to fifty days for a single farmer to plant a one-hectare field of rice. And recent years have seen a migration of working aged men and women from rural Cambodian farming communities to more urban locales in order to work in garment factories or construction in Cambodia or in other Southeast Asian countries.

This migration has reduced the amount of labor available to these Cambodian communities, forcing farmers in Cambodia to either plant fewer fields of rice or use less efficient methods for planting rice (such as spreading rice seeds by hand on dry ground, which results in sub-optimal arrangements of the rice crop and many of the seeds being eaten by animals or failing to sprout). The resulting reduction in crop yields negatively impacts Cambodian farm families, who already struggle to satisfy their nutritional needs (and to meet their needs for adequate healthcare and education).

To solve these challenges faced by Cambodian farmers, as well as farmers in other Southeast Asian rice-planting countries, there remains a need for the development and distribution of devices and techniques that would enable these farmers to plant rows of crops while reducing the time, labor, costs, and overall resources needed to plant their crops. Such devices and techniques would allow these farmers to employ their labor more efficiently and waste less seed, water, and fertilizer in the planting process, not only improving crop yields, but also providing an opportunity for these farmers to allocate more of their time elsewhere (for example, obtaining education). These devices and techniques would ultimately aid in raising the income of farmers, helping to lift them and their families out of poverty.

While devices for planting rice seeds exist, no known existing designs are sufficient to meet the above-mentioned needs of farmers in Cambodia or other Southeast Asian nations. While sophisticated devices for planting rice seed exist and are used in more industrialized nations, such mechanized devices are too expensive and complex for small-scale farmers. Furthermore, for example, Cambodia's manufacturing sector is relatively less-developed in comparison with some neighboring countries. Therefore, for a device for planting rice to be truly accessible to Cambodian farmers (or rural farmers in other Southeast Asian countries) at a reasonable cost, that device must be capable of being manufactured locally, using readily available materials and manufacturing processes.

Simpler devices, such as broadcast planters that use air power to spray seeds, are inefficient, blowing rice seed in uncontrolled patterns and lacking the concentrated velocity necessary to embed the rice seed into the soil. If not embedded into the soil, the rice remains on top of the soil, and is readily eaten by animals or blown away by wind or washed away by rains. Drum seeders, which are rolled on the ground and drop seed out of holes, also cannot embed the dropped rice seeds into soil, similarly leaving the rice susceptible to being eaten or swept away by wind or rain. Other attempts at developing a suitable device for planting rice seeds suffered from repeated jamming problems, causing these attempts to fail.

As discussed above, existing devices and techniques for planting rice seed suffer from deficiencies: failing to effectively plant rice seed in rows without unduly wasting seed, labor, and other resources. As a result, there remains a need for devices and techniques for planting rice seeds that do not suffer from the drawbacks shared by these existing devices and methods.

SUMMARY OF THE INVENTION

The present invention is directed, in certain embodiments, to devices for planting seeds, the devices comprising a storage container, an air propulsion apparatus connected to the storage container, a first hollow member, a hollow horizontal member connected to the first hollow member, and a plurality of hollow vertical members connected to a bottom of the hollow horizontal member. In certain embodiments, the storage container contains seeds. In certain further embodiments, the storage container is capable of holding at least 10 kilograms of seeds. In still further embodiments, the storage container is capable of holding at least 20 kilograms of seeds.

In certain embodiments, the air propulsion apparatus is connected to the hollow horizontal member via the first hollow member.

In certain embodiments, the first hollow member is a hose.

In certain embodiments, the air propulsion apparatus is a broadcast planter. In certain further embodiments, the broadcast planter is a gasoline-powered broadcast planter. In other further embodiments, the broadcast planter is an electric-powered broadcast planter. In still further embodiments, the electric-powered broadcast planter comprises a battery.

In certain embodiments, the hollow horizontal member comprises a plurality of pipes and flow reducers connected by T-connectors. In certain further embodiments, the device further comprises elbow connectors connected to a first and a second end of the hollow horizontal member, and a flow reducer connected to each of the elbow connectors. In still further embodiments, the plurality of pipes, flow reducers, T-connectors, and elbow connectors are comprised of PVC.

In certain embodiments, a diameter of the hollow horizontal member at a center of the hollow horizontal member is greater than both: a) a diameter of the hollow horizontal member at a first end of the hollow horizontal member; and b) a diameter of the hollow horizontal member at a second end of the hollow horizontal member. In certain further embodiments, the diameter of the hollow horizontal member at the first end is equal to the diameter of the hollow horizontal member at the second end.

In certain embodiments, a diameter of the hollow horizontal member at a center of the hollow horizontal member is equal to both: a) a diameter of the hollow horizontal member at a first end of the hollow horizontal member; and b) a diameter of the hollow horizontal member at a second end of the hollow horizontal member.

In certain embodiments, the first hollow member is connected to the hollow horizontal member by a T-connector at a center of the hollow horizontal member. In certain further embodiments, the first hollow member is connected to the hollow horizontal member at a top of the hollow horizontal member. In certain embodiments, the T-connector comprises a protrusion that divides a perpendicular inlet of the T-connector in half. In certain further embodiments, the protrusion comprises a sheet of material.

In certain embodiments, each of the plurality of hollow vertical members is connected to the bottom of the hollow horizontal member by either a T-connector or an elbow connector. In certain further embodiments, each of the plurality of hollow vertical members comprises a PVC pipe.

In certain embodiments, a diameter of a first end of each of the plurality of hollow vertical members is larger than a diameter of a second end of each of the plurality of hollow vertical members. In certain further embodiments, the diameter of the first end of each of the plurality of hollow vertical members is equal to or lesser than a diameter of a midpoint of each of the plurality of hollow vertical members. In still further embodiments, the first end of each of the plurality of hollow vertical members is located within the T-connector or elbow connector connecting the hollow vertical member to the hollow horizontal member.

In certain embodiments, the first end of the at least one of the plurality of hollow vertical members comprises a baffle. In certain further embodiments, the first end of the at least one hollow vertical member comprises a notch. In still further embodiments, a diameter of the first end of the at least one hollow vertical member above the notch is smaller than a diameter of the first end of the at least one hollow vertical member below the notch. In even further embodiments, the hollow horizontal member is engaged with the notch in the first end of the at least one hollow vertical member.

In certain embodiments, the second end of each of the plurality of hollow vertical members comprises a nozzle. In further embodiments, the second end of each of the plurality of hollow vertical members further comprises a nozzle cover. In still further embodiments, the nozzle cover comprises a flexible hose.

In certain embodiments, the plurality of hollow vertical members comprises between 4 hollow vertical members and 40 hollow vertical members. In certain further embodiments, the plurality of hollow vertical members comprises between 10 hollow vertical members and 30 hollow vertical members. In still further embodiments, the plurality of hollow vertical members comprises between 14 hollow vertical members and 18 hollow vertical members. In other further embodiments, the plurality of vertical members comprises between 22 hollow vertical members and 26 hollow vertical members.

In certain embodiments, the plurality of hollow vertical members are evenly spaced along the hollow horizontal member.

The present invention is directed, in certain embodiments, to systems for planting seeds, the systems comprising a storage container, an air propulsion apparatus connected to the storage container, a first hollow member, a hollow horizontal member connected to the first hollow member, and a plurality of hollow vertical members connected to a bottom of the hollow horizontal member.

In certain embodiments, at least one of the storage container, the air propulsion apparatus, the first hollow member, the hollow horizontal member, and the plurality of hollow vertical members is mounted on a movable support. In certain further embodiments, the movable support comprises a cart. In still further embodiments, the cart comprises wheels or skis. In even further embodiments, the cart is human-powered, animal-powered, or machine-powered. In certain embodiments, the moveable support is covered with a rust-resistant coating.

In certain embodiments, at least one of the storage container, the air propulsion apparatus, the first hollow member, the hollow horizontal member, and the plurality of hollow vertical members is carried by a human user.

The present invention is directed, in certain embodiments, to methods for planting seeds, the methods comprising the steps of filling a storage container with seeds, emptying the seeds from the storage container into an air propulsion apparatus, and propelling the seeds through the air propulsion apparatus, through a first hollow member, through a horizontal hollow member, through a plurality of vertical hollow members, and into the ground.

In certain embodiments, the methods comprise the step of soaking the seeds in water for a period of time and then drying the seeds before filling the storage container with the seeds.

In certain embodiments, a first end of at least one of the plurality of vertical hollow members comprises a baffle located inside the hollow horizontal member, and an equal volume of seeds is propelled into each of the plurality of vertical horizontal members. In certain further embodiments, a second end of each of the plurality of vertical hollow members comprises a nozzle, and the velocity of the seeds exiting the nozzle of the vertical hollow member is greater than or equal to the velocity of the seeds entering the first end of the vertical hollow member.

In certain embodiments, filling the storage container with seeds comprises filling the storage container with both seeds and fertilizer. In certain further embodiments, the fertilizer mixes with the seeds to create a mixture of seeds and fertilizer, and the mixture empties from the storage container into the air propulsion apparatus, which propels the mixture through the air propulsion apparatus, through the first hollow member, through the horizontal hollow member, and through the plurality of vertical hollow members and into the ground.

The present invention is directed, in certain embodiments, to methods of manufacturing devices for planting seeds, the methods comprising the steps of thermal forming a T-connector from PVC, thermal forming a sheet of PVC, inserting the sheet of PVC into the T-connector to form a flow divider, resizing a plurality of PVC pipes, flow reducers, T-connectors, and elbow connectors and gluing the plurality of PVC pipes, flow reducers, T-connectors, and elbow connectors together to form a hollow horizontal member, connecting a storage container to a first hollow member via an air propulsion apparatus, connecting the hollow horizontal member to the first hollow member via the flow divider, thermal die forming a first end of at least one of a plurality of vertical hollow members to form a baffle, thermal die forming a second end of each of the plurality of vertical hollow members to form a nozzle, and inserting the first end of each of the plurality of vertical hollow members into a bottom of the hollow horizontal member.

In certain embodiments, the step of resizing the plurality of PVC pipes, flow reducers, T-connectors, and elbow connectors comprises cutting and grinding the plurality of PVC pipes, flow reducers, T-connectors, and elbow connectors.

In certain embodiments, the methods further comprise the step of covering the horizontal hollow member and the plurality of vertical hollow members with a UV-resistant coating.

In certain embodiments, the methods further comprise the step of enclosing the hollow horizontal member with a PVC pipe with an inner diameter less than or equal to an outer diameter of the hollow horizontal member. In certain further embodiments, enclosing the hollow horizontal member with the PVC pipe comprises cutting a slit in a bottom of the PVC pipe and stretching the PVC pipe to enclose the hollow horizontal member.

BRIEF DESCRIPTION OF THE DRAWINGS

FIG. 4B depicts a front view of the hollow horizontal member and plurality of hollow vertical members of FIG. 1.

FIG. 4C depicts a side view of the hollow horizontal member and plurality of hollow vertical members of FIG. 1.

FIG. 4D depicts a top view of the hollow horizontal member and plurality of hollow vertical members of FIG. 1.

FIG. 4E depicts a bottom view of the hollow horizontal member and plurality of hollow vertical members of FIG. 1.

DETAILED DESCRIPTION OF THE INVENTION

The present invention is directed to air-powered devices for planting seeds, systems incorporating those air-powered devices, as well as to methods of operating and manufacturing such devices and systems for planting seeds. One embodiment of the invention is a device for planting seeds, comprising a storage container, an air propulsion apparatus, a first hollow member, a hollow horizontal member, and a plurality of hollow vertical members. The storage container is connected to the air propulsion apparatus, which uses air propulsion to propel seeds throughout the hollow members of the device and into the ground to be planted.

A second embodiment of the invention is a system for planting seeds. The system incorporates the air-powered device, and at least a portion of the device is mounted on a movable support or carried by a human user.

A third embodiment of the invention is a method of planting seeds, comprising filling the storage container with seeds, emptying the seeds from the storage container into the air propulsion apparatus, and using air power from the air propulsion apparatus to propel seeds throughout the hollow members of the device and into the ground to be planted.

A fourth embodiment of the invention is a method for manufacturing the air-powered device for planting seeds, comprising thermal forming a flow divider from PVC, resizing and gluing together a plurality of PVC pipes, flow reducers, T-connectors, and elbow connectors to form a hollow horizontal member, thermal die forming a plurality of vertical hollow members, and connecting together the storage container, air propulsion apparatus, hollow horizontal member, and the plurality of vertical hollow members to prepare the air-powered device for planting seeds.

Figure 1:
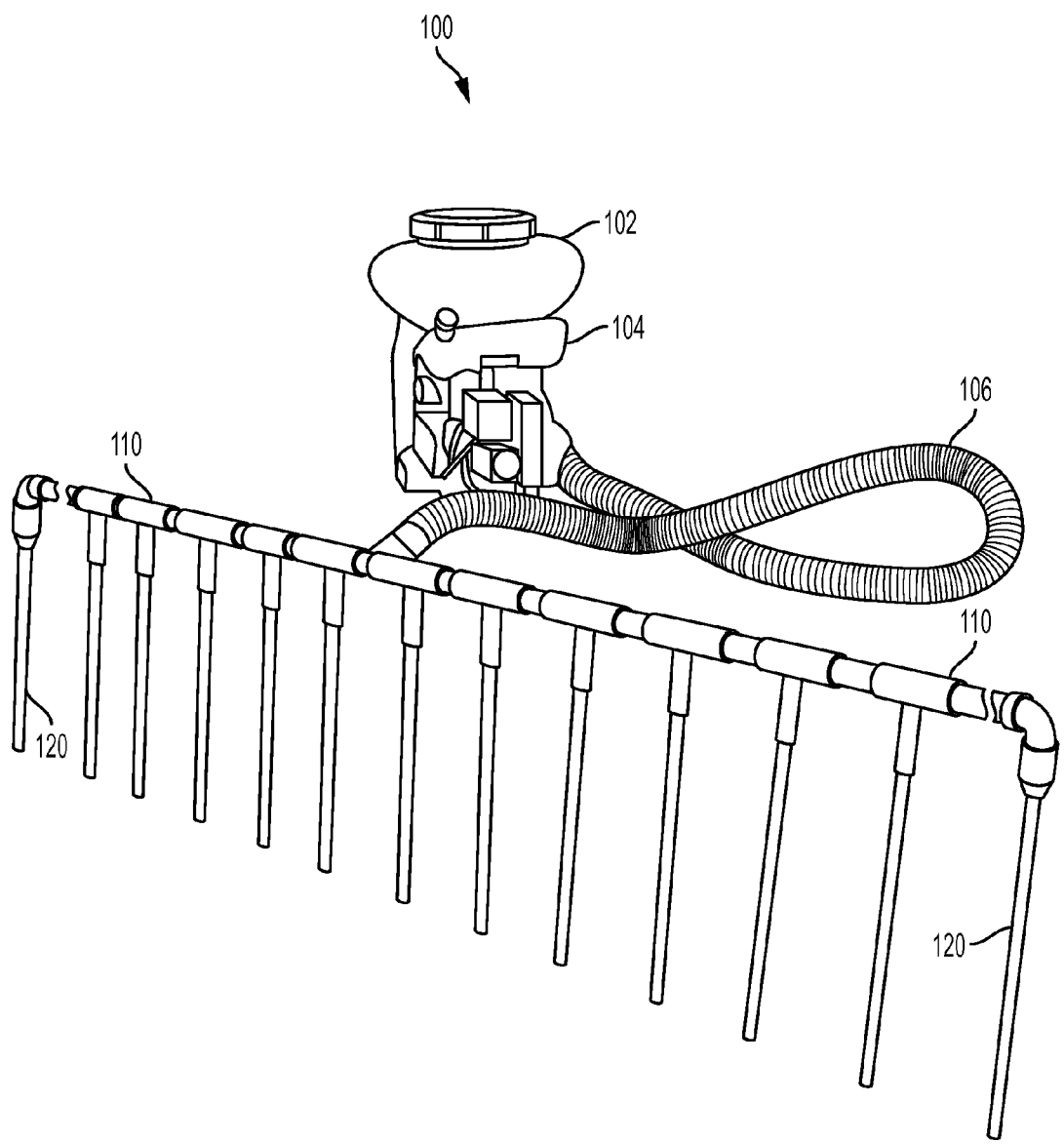
FIG. 1 depicts a perspective view of an exemplary device for planting seeds, the device comprising a storage container, an air propulsion apparatus, and a first hollow member, hollow horizontal member, and plurality of hollow vertical members.

FIG. 1 depicts an exemplary embodiment of a device 100 for planting seeds, in accordance with the present invention. The device 100 comprises a storage container 102 capable of storing seeds and then releasing those seeds into the device 100 during the planting process. In these embodiments, the storage container 102 holds seeds, fertilizer, or a mixture of both seed and fertilizer. In some embodiments, the storage container 102 contains rice seeds. However, the type of seed stored in the storage container 102 is not limited to rice seeds—the storage container 102 may instead contain (for example) seed for corn, mung beans, soy beans, or other types of grains or legumes.

In embodiments, the storage container 102 is comprised of plastic. However, the storage container 102 may be composed of other materials as well: for example, metals such as steel and/or aluminum, other polymers (such as PVC), or even wood. In certain embodiments of the invention, such as the storage container 102 depicted in the device 100 of FIG. 1, the storage container 102 is a hopper 102 that is integrated into an air propulsion device 104, such as a hopper 102 that feeds into a broadcast planter 104. In other embodiments, however, the storage container 102 may be separate from the air propulsion device. In these various embodiments, the storage container 102 may be a hopper, a tub, a basket, or similar storage containers 102. The storage container 102 may be cylindrical, square, rectangular, or any other shape suitable for holding seed, fertilizer, and other materials used in the planting process.

In embodiments of the present invention, the storage container 102 has sufficient size and strength to be capable of holding at least 10 kilograms of seeds and/or fertilizer. In some of these embodiments of the present invention, the storage container 102 possesses sufficient size and strength to be capable of holding at least 10 kilograms of seeds (and/or fertilizer). Further, in some of these various embodiments, the storage container 102 is of sufficient size and strength to house at least 15, at least 20, at least 25, or at least 30 kilograms of seeds (and/or fertilizer). The storage containers 102 of the present invention will be capable of holding a varying amount of seeds depending upon the dimensions of the storage container 102, the type of seeds (and their size) placed in the storage container 102, whether the seeds were enlarged by soaking them overnight in water before planting, and other considerations.

As discussed above, the seeds in storage container 102 may have been soaked, and then dried, before the storage container 102 was filled with those seeds. Soaking the seeds enables the seeds to more efficiently embed in the ground and to germinate at a faster rate. If the seeds are not soaked before planting, they may be more susceptible to being blown away in strong winds, or being eaten by animals, before they embed in the ground and germinate.

In addition to storage container 102, the device 100 for planting seeds in a field comprises an air propulsion apparatus 104 connected to the storage container 102. In preferred embodiments of the present invention, the device 100 for planting seeds in a field comprises an air propulsion apparatus 104. In certain preferred embodiments of the invention, the air propulsion apparatus 104 is a broadcast planter 104 (also known as a broadcast seeder, a seed blower, or a broadcast seed blower). The broadcast planter 104 is an agricultural device commonly used to spread seed, fertilizer, and other substances as well (such as, for example, mulch, lime, salt, or other granular products). Suitable fertilizers for use with broadcast planter 104 include, for example, NPK 18-46-0, NPK 15-15-15, NPK 16-20, or NPK 46. The broadcast planter 104 operates by feeding seeds or fertilizer from a hopper 102 at a controlled rate into an air-powered seed blower, which projects the seeds out of the seed blower by spraying them using air power. In some embodiments of the present invention, the seed blower of the broadcast planter 104 is gasoline- or diesel-powered. However, in other embodiments of the invention, the seed blower of the broadcast planter 104 is electric-powered, and can comprise, for example, a rechargeable battery which may be recharged from electricity from solar power, wind power, or other renewable energy sources. Instead of a broadcast planter 104, however, the air propulsion apparatus 104 could also comprise, for example, a leaf blower.

In preferred embodiments of the invention, the device 100 for planting seeds comprises a hollow member 106 connected to the air propulsion apparatus 104. In these embodiments, the seeds (and/or fertilizer, or mulch, or other granular material) are propelled into (and through) the hollow member 106 by the air propulsion apparatus 104, and the hollow member 106 serves to connect the seed storage container 102 and air propulsion apparatus 104 to the rest of the device 100 for planting seeds.

In certain embodiments, the hollow member 106 attached to the air propulsion apparatus 104 may be a flexible hollow member 106, such as the hose 106 depicted in FIG. 1. In these embodiments, the hollow member 106 may comprise a hose 106 (either a corrugated or non-corrugated hose), composed of (for example) a rubber or a flexible polymer. In other embodiments, however, the hollow member 106 attached to the air propulsion apparatus 104 may be made of a rigid material, such as (for example) PVC pipe, aluminum, steel, or other suitable materials. In these embodiments, the hollow member 106 may be a rigid cylindrical tube, for example, instead of a flexible hose.

As shown in the device 100 depicted in FIG. 1, while one end of flexible hollow member 106 is connected to air propulsion apparatus 104, the other end of flexible hollow member 106 is connected to a horizontal member 110, into which the seeds from storage container 102 are propelled from broadcast planter 104 and through flexible hollow member 106 into horizontal member 110. The device 100 also comprises a plurality of vertical members 120, which are each attached to a bottom of horizontal member 110. The seeds propelled into hollow horizontal member 110 are propelled through the hollow horizontal member 110 towards the ends of hollow horizontal member 110 and into the plurality of hollow vertical members 120, and from the ends of the vertical members 120 into the ground for planting.

In various embodiments of the device 100 depicted in FIG. 1, the number of vertical members 120 that are attached to hollow horizontal member 110 may vary, based on, for example, the size of hollow horizontal member 110, and/or the type (and power) of the air propulsion apparatus 104. In some preferred embodiments, the device 100 comprises an equal number of vertical members 120 on each side of the point where flexible hollow member 106 connects to hollow horizontal member 110, the distances between each pair of adjacent vertical members 120 are constant and equal, and the device 100 is configured so that an equal amount of seed is propelled through each individual one of the plurality of vertical members 120. In these embodiments, the device 100 will have an even number of vertical members 120. An equal amount of seed being propelled through each one of the plurality of vertical members 120 allows a farmer to plant even, equidistantly spaced rows of crops, which each row containing a relatively equal number of plants. In other embodiments, however, the number of vertical members 120 on each side of the point where flexible hollow member 106 connects to hollow horizontal member 110 may be different.

In various embodiments of the present invention, the plurality of hollow vertical members 120 can comprise between 4 and 40 hollow vertical members, between 10 and 30 hollow vertical members, between 22 and 26 hollow members, or between 14 and 18 hollow vertical members.

The relative amounts of seed propelled through each of the plurality of vertical members 120 can be tested by running the device 100 in an experimental environment, and measuring the amount of seed that is propelled through each of the plurality of vertical members 120 by placing a bag or sock over the end of each of the plurality of vertical members 120, and then comparing the relative amount of seed that has been collected in each bag or sock.

In the exemplary embodiment depicted in FIG. 1, the air propulsion apparatus 104 can be carried by a user of the device 100, for example by mounting the storage container 102 and air propulsion apparatus 104 on a backpack (not shown) or other equipment that can be carried by a user. In these embodiments, one user may carry the storage container 102 and air propulsion apparatus 104 around a field using a backpack or similar equipment, and one or more other users may aid in moving the horizontal member 110 and vertical members 120 around the field during the planting process.

Figure 2:
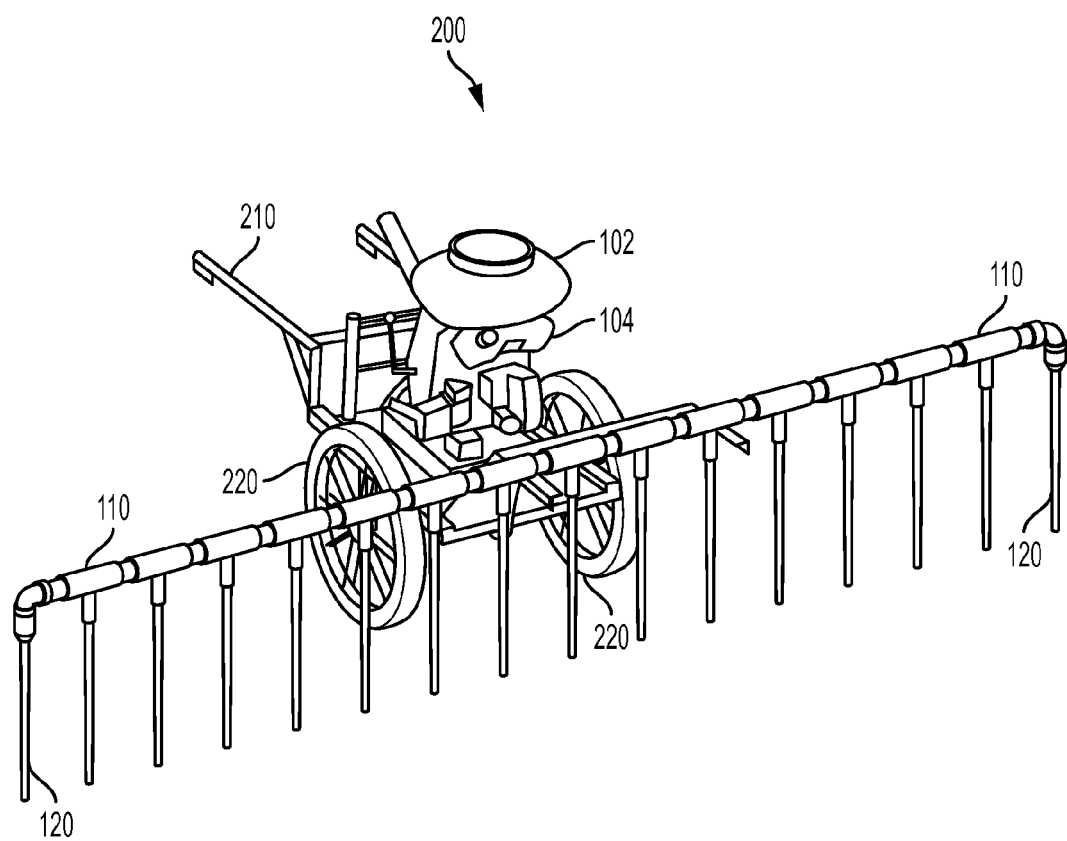
FIG. 2 depicts a perspective view of the device for planting seeds of FIG. 1, the device being mounted on a cart that comprises wheels.

FIG. 2 depicts a different embodiment of a system 200 for planting seeds, in which the storage container 102, air propulsion apparatus 104, horizontal member 110, and vertical members 120 are mounted on a moveable support 210. In this exemplary system 200, the moveable support 210 is a cart 210 with wheels 220—however, the moveable support could take other forms as well (for example, a sled). In system 200, the cart 210 helps bear the weight of the storage container 102, air propulsion apparatus 104, horizontal member 110, and vertical members 120, and wheels 220 aid a user of system 200 of moving the system 200 around a field to plant seeds using system 200. The cart 210 and wheels 220 may be made of metals (such as iron, steel, stainless steel, or aluminum), or other materials such as PVC, bamboo, or wood, (or, in the case of the wheels, rubber) and may be coated with one or more substances that protect the cart 210 from rust and/or degradation from ultraviolet (UV) rays (such as rust- and/or UV-resistant paint(s)). In some embodiments, part of the system 200 may be mounted on cart 210 and wheeled (or otherwise moved) by a first user, and a separate part of the system 200 may be carried around the field separately by one or more other users. In other exemplary embodiments, however, the cart 210 may be towed by an animal, or may have a motor or other propulsion device capable of mechanically propelling cart 210 with little or no effort from a user.

Figure 3:
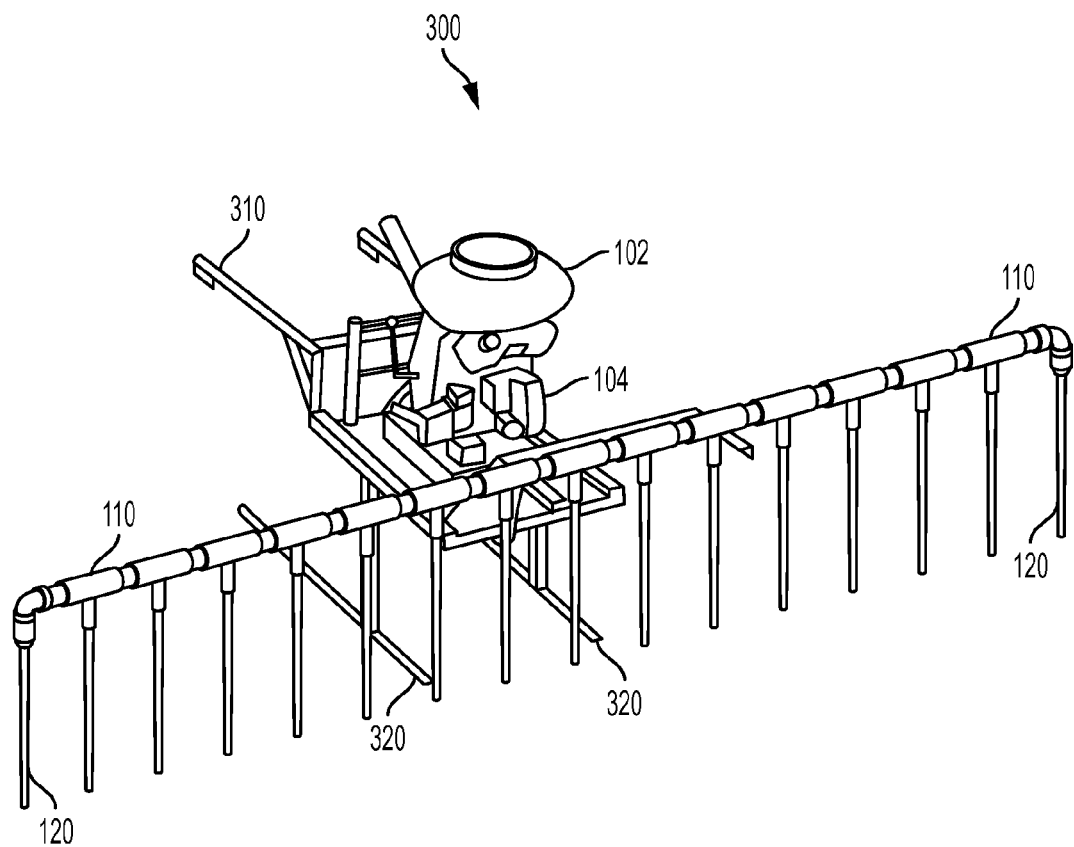
FIG. 3 depicts a perspective view of the device for planting seeds of FIG. 1, the device being mounted on a cart that comprises skis.
Figure 4A:
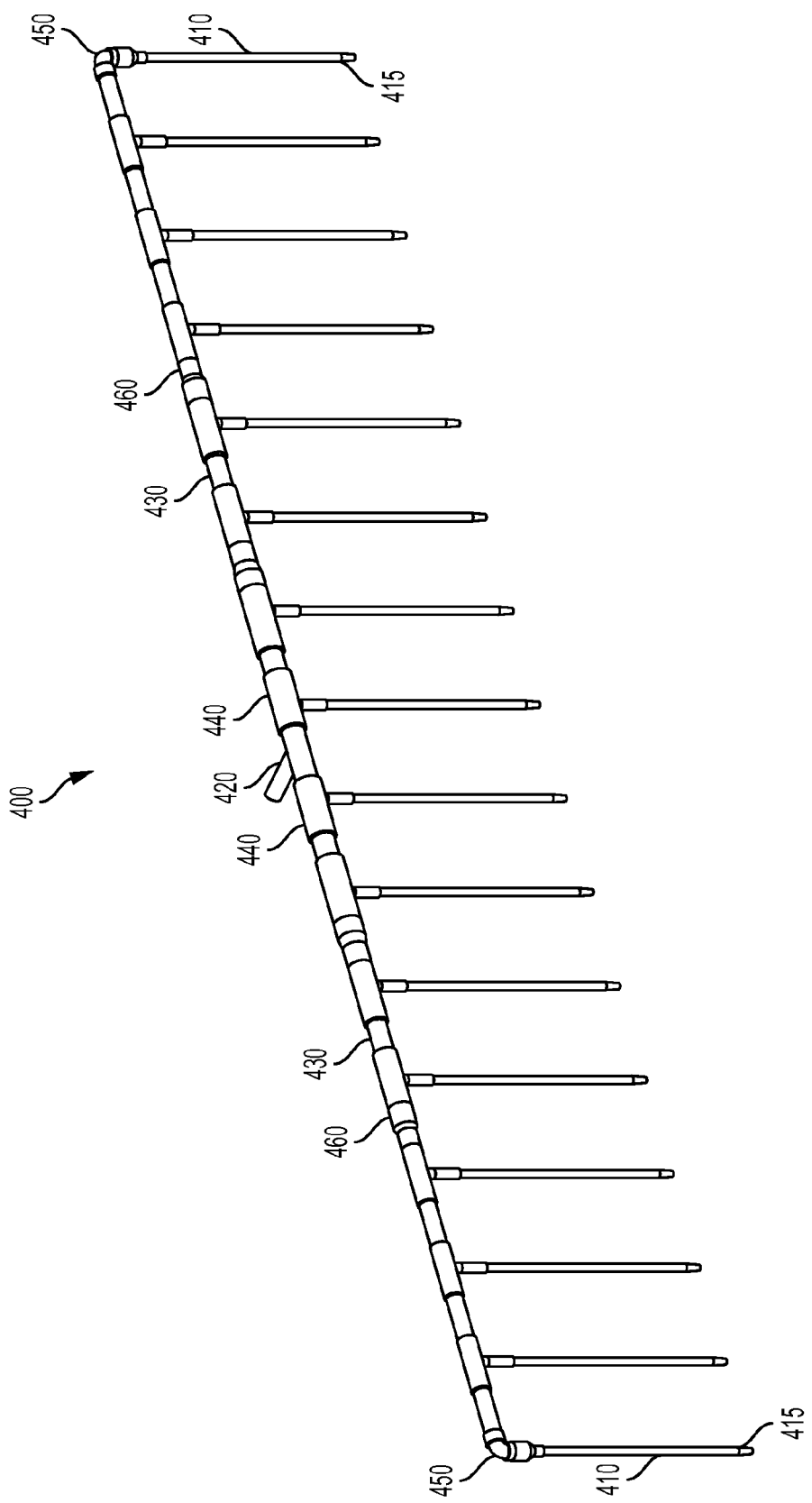
FIG. 4A depicts a perspective view of the hollow horizontal member and plurality of hollow vertical members of FIG. 1.

The wheels 220 of cart 210 are useful in moving system 200 around a field in which the ground is relatively firm. However, if the field is inundated with water or relatively muddy (as rice paddies commonly are), the wheels 220 of cart 210 may become bogged down in mud or water, making it difficult to move system 200 around the field. FIG. 3 depicts a different exemplary system 300, featuring a cart 310 with two skis 320 upon which the cart 310 is mounted. The skis 320 are preferred in wetter environments, such as an inundated rice paddy, in which it is easier for the system 300 to slide over the ground of a field instead of using rolling wheels that can become bogged down in the wet ground, such as the wheels 220 of the cart 210 shown in FIG. 2. The skis 320 of system 300 may be made of different materials, for example a rigid plastic (such as PVC plastic) or other polymers, a metal (such as steel or aluminum), or composite materials.

FIGS. 4A-E depicts an exemplary embodiment of the "piping" system 400 that comprises both the hollow horizontal member and vertical members of a device for planting seeds. In this exemplary embodiment, the piping system 400 attaches to a flexible hollow member (such as hollow member 106 depicted in FIG. 1) via a T-connector 420. The T-connector 420 receives seeds from an air propulsion device (not shown), such as a broadcast planter, and distributes the seeds evenly to each side of the T-connector 420 by utilizing a "flow divider" inside the T-connector 420 which splits the flow of seeds. The flow divider (not shown in this view) may be a flat, planar sheet of material, which splits the volume inside the perpendicular inlet of the T-connector 420 in half. The T-connector 420 may be positioned so that the flexible hollow member is attached to the top of the hollow horizontal member, to the side of the hollow horizontal member, or at an angle in-between.

In exemplary preferred embodiments, T-connector 420 and the flow divider inside are both comprised of polyvinyl chloride (PVC) plastic. The T-connector 420 and the flow divider may be manufactured by thermal forming the T-connector 420 from PVC, thermal forming a sheet of PVC, and then inserting the thermal-formed sheet of PVC into the perpendicular inlet of the T-connector 420 to form a flow divider within that perpendicular inlet.

The hollow horizontal member of piping system 400 is comprised of a number of T-connectors 440 and flow reducers 460 that connect segments of pipe 430 to form the hollow horizontal member. The T-connectors 440 connect both the segments of pipe 430 with each other, and also connect the vertical members 410 to the hollow horizontal member. In the exemplary preferred embodiment 400 depicted in FIGS. 4A-E, the segments of pipe 430 decrease in diameter along the length of hollow horizontal member away from T-connector 420 towards the ends of the hollow horizontal member, because the amount of seed flowing through the segments of pipe 430 decreases at increasing distances from the receiving T-connector 420 as seed is directed into each of vertical members 410. The flow reducers 460 connect segments of pipe 430 of different diameters, allowing the hollow horizontal member to decrease in diameter so that a diameter of the hollow horizontal member is greater at the T-connector 420 than either of the two ends of the hollow horizontal member, which each comprise elbow connectors 450 which connect the end vertical members 410 to the hollow horizontal member.

The segments of pipe 430, the T-connectors 420 and 440, and the flow reducers 460 may be comprised of varying materials, such as metals, polymers, or composites. However, in exemplary preferred embodiments of the piping system 400, the segments of pipe 430, the T-connectors 420 and 440, and the flow reducers 460 are all comprised of polyvinyl chloride (PVC) plastic. In exemplary embodiments, the segments of pipe 430, the T-connectors 420 and 440, and the flow reducers 460 are resized and then connected together to form the horizontal hollow member of system 400. Resizing includes, for example, cutting, grinding, and using other machining techniques to resize the segments of pipe 430, the T-connectors 420 and 440, and the flow reducers 460. After the segments of pipe 430, the T-connectors 420 and 440, and the flow reducers 460 are connected together, they can be glued together to form the hollow horizontal member.

While the hollow horizontal member of exemplary embodiment 400 is comprised of a plurality of interconnected segments of pipe 430, T-connectors 420 and 440, and flow reducers 460 as described above, in other embodiments of the invention, the hollow horizontal member may comprise a single hollow horizontal component (not shown). In these embodiments, the single hollow horizontal component may be a tube, pipe, or cylinder. In certain embodiments, the single hollow horizontal component has a constant diameter along its length. In other embodiments, the ends of the hollow horizontal component each have a smaller diameter than the center of the hollow horizontal component.

In the exemplary embodiment 400 depicted in FIGS. 4A-E, the piping 400 comprises sixteen vertical members 410, with eight vertical members 410 evenly spaced along each side of the T-connector 420. In this exemplary embodiment, an equal amount of seed is directed into each of the eight vertical members 410. In exemplary piping system 400, of the vertical members 410 decreases in diameter from the top of the vertical member 410 to the bottom of the vertical member 410, forming a nozzle 415 at the end of vertical member 410. The nozzle 415 increases the velocity of seeds being propelled from vertical member 410 (as the cross-sectional area of nozzle 415 is smaller in comparison to the upper part of vertical member 410), and also focuses the area in which seeds are propelled from vertical member 410, allowing seeds to effectively embed into the ground of a field in neat, equidistant rows. In some embodiments, the diameter of the vertical member 410 may remain constant along the majority of the vertical length of vertical member 410, only decreasing at the portion of vertical member 410 that comprises nozzle 415. In other embodiments, the diameter of the vertical member 410 may vary along the entire vertical length of vertical member 410, gradually growing smaller as it gets closer to nozzle 415.

In preferred embodiments of the invention, vertical member 410, like the segments of pipe 430, the T-connectors 420 and 440, and the flow reducers 460, is comprised of polyvinyl chloride (PVC) plastic. Nozzle 415 can be manufactured by thermal die forming an end of vertical member 410 into nozzle 415. The vertical members 410 can then be inserted and glued into the perpendicular inlets of T-connectors 440 to connect the vertical members 410 to the piping system 400.

In embodiments, in which vertical members 410, segments of pipe 430, the T-connectors 420 and 440, and flow reducers 460 are comprised of PVC, the PVC piping can be covered or coated with a UV-resistant paint or other coating which helps those PVC pieces resist degradation from ultraviolet radiation, prolonging the life of piping system 400.

Figure 5:
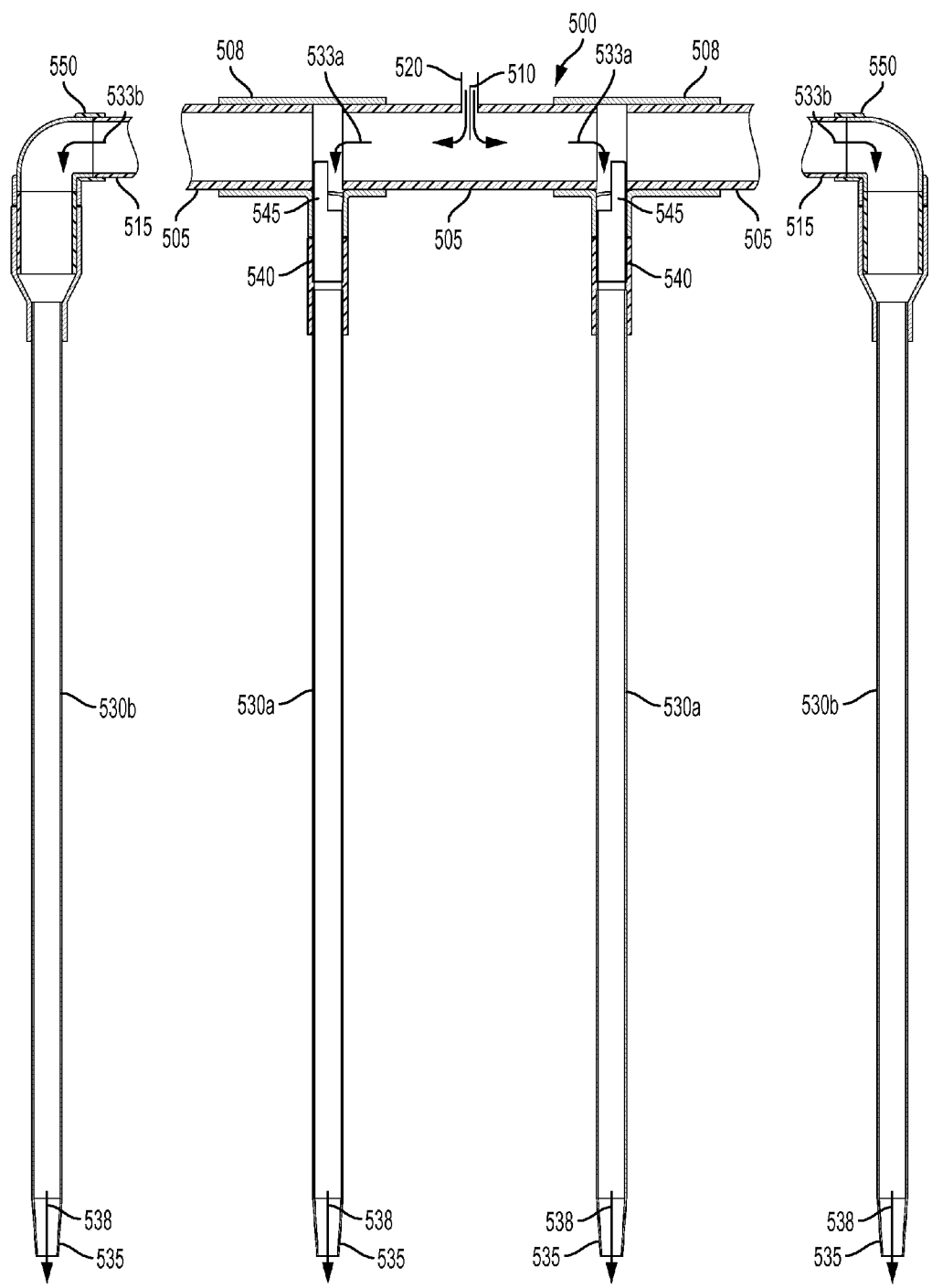
FIG. 5 depicts an interior cross-sectional view of the hollow horizontal member and the plurality of hollow vertical members of FIGS. 4A-4E.
Figure 6A:
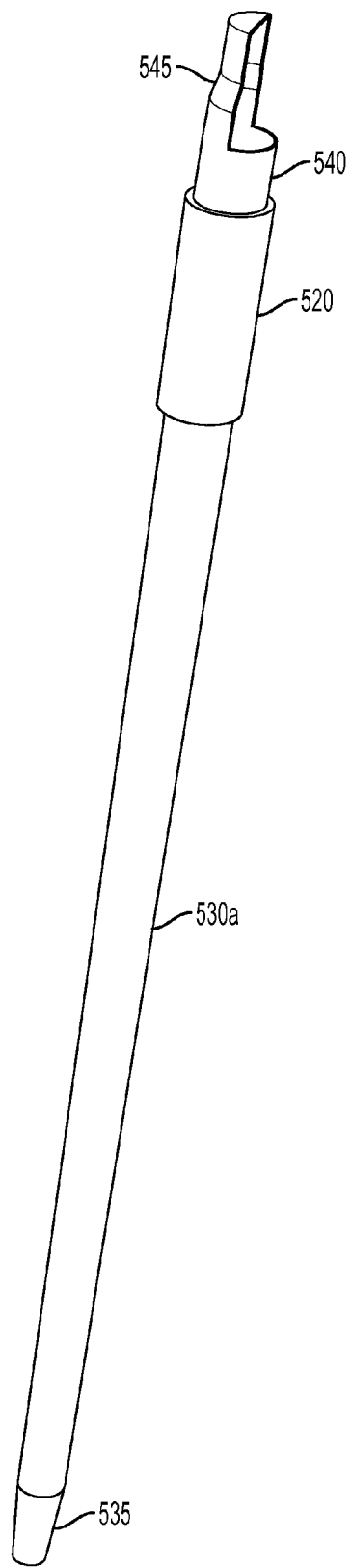
FIG. 6A depicts a perspective view of one of the hollow vertical members depicted in FIGS. 4A-4E.
Figure 6B:
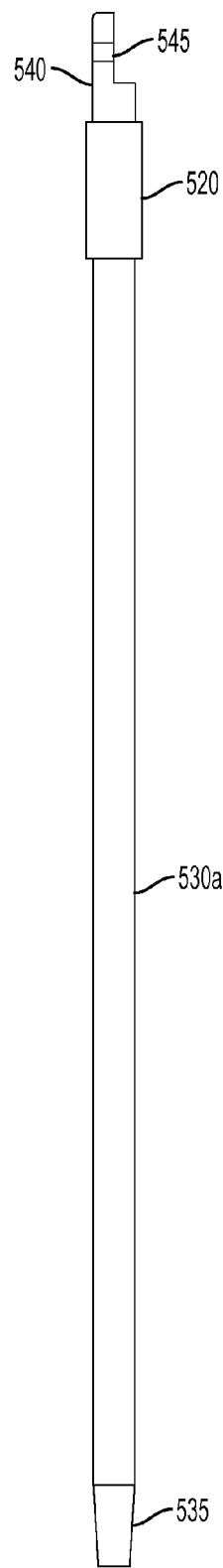
FIG. 6B depicts a front view of one of the hollow vertical members depicted in FIGS. 4A-4E.
Figure 6C:
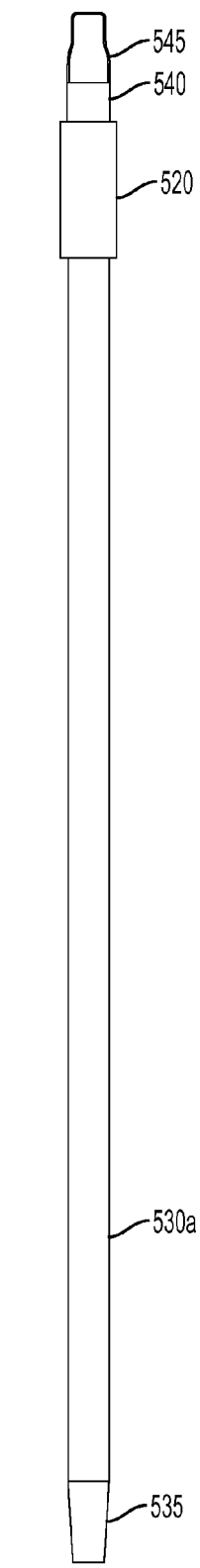
FIG. 6C depicts a side view of one of the hollow vertical members depicted in FIGS. 4A-4E.
Figure 6D:
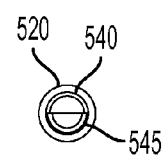
FIG. 6D depicts a top view of one of the hollow vertical members depicted in FIGS. 4A-4E.
Figure 6E:
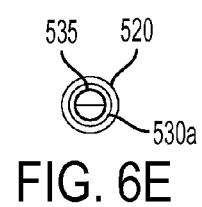
FIG. 6E depicts a bottom view of one of the hollow vertical members depicted in FIGS. 4A-4E.

FIG. 5 is a cross-sectional view of exemplary piping system 500, which illustrates the flow of seed (and/or fertilizer) through system 500. As seed enters the system 500 at the perpendicular inlet of T-connector 520, flow divider 510 acts to split the flow of seed in half, directing each half of the seed flow to each side of flow divider 510 and into interior segments of piping 505. Each of the interior segments of piping 505 is connected to each other and to interior vertical members 530a via T-connectors 508, and the end segments of piping 515 are connected to end vertical members 530b via elbow connectors 550. In this exemplary embodiment 500, the interior segments of piping 505 have a larger diameter than the end segments of piping 515. Seed exits the vertical members 530a and 530b at relatively higher velocity from nozzle 535, as depicted by flow arrows 538.

As seed is propelled horizontally away from T-connector 520 and flow divider 510, it is caught by the cup-shaped baffles 545 that are connected to the top of the interior vertical tubes 530a. Each baffle 545 has a closed top, and is shaped as a cup or closed half-pipe which "catches" and re-directs seed (and/or fertilizer) away from the horizontal flow into interior vertical tubes 530a, as illustrated by flow arrows 533a. In preferred embodiments, the baffles 545 are designed so that each interior vertical member 530a catches and receives an approximately equivalent amount of seed. Each of the baffles 545 is connected to a respective interior vertical tube 530a by connector 540.

As the flow of seed reaches the end piping segments 515, all of the seed remaining in the flow is directed into end vertical members 530b, as illustrated by flow arrows 533b. Thus, there is no need for end vertical members 530b to be connected to baffles that catch and redirect only a portion of the seed in the flow.

By catching and redirecting approximately equal amounts of seed (and/or fertilizer), the baffles 545 ensure that approximately equal amounts of crops are planted in each row, and help prevent the device from jamming from one or more vertical tubes 530a or 530b having seed propelled into it at too great a rate.

The baffles 545 may be manufactured from different materials, but in exemplary preferred embodiments, the baffles 545 are comprised of PVC plastic. In these embodiments, the baffles 545 are manufactured by thermal die forming, in which the PVC is heated and then formed/folded around a metal or wooden die having the desired cup-like, closed half-pipe shape for the baffle 545.

FIGS. 6A-E depict an exemplary interior vertical pipe 530a having a nozzle 535 for propelling seed (and/or fertilizer) and attached to a baffle 545 via connector 520. The bottom portion 540 of baffle 545 connects the baffle 545 to connector 520, allowing the cup-shaped baffle 545 to catch and redirect seed into the vertical member 530a. As depicted in FIGS. 6A-E, the baffle 545 may decrease in diameter further away from the bottom portion 540 of baffle 545, and may comprise a notch that can attach to an edge of the horizontal piping.

Figure 7:
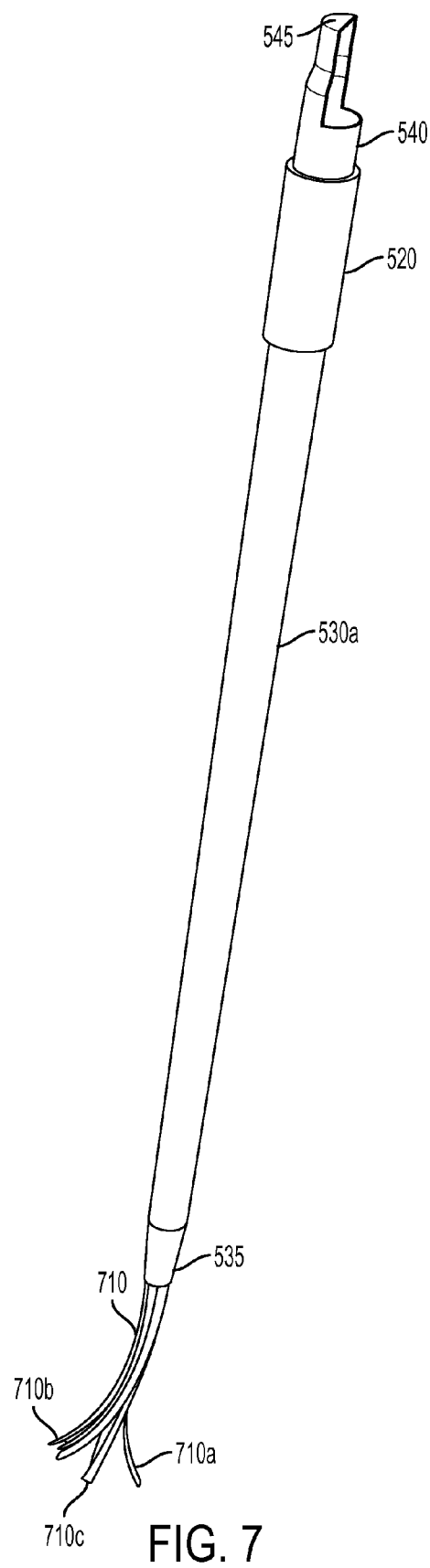
FIG. 7 depicts a perspective view of the exemplary hollow vertical member depicted in FIGS. 6A-6E, the hollow vertical member further comprising a nozzle cover.

FIG. 7 depicts an exemplary embodiment of a vertical member 530a in which a nozzle cover 710 has been attached to nozzle 535. In this exemplary embodiment, the nozzle cover 710 comprises a plurality of flexible strands 710a-c which aid in planting seeds on ground that is relatively dry and firm. When propelled from the nozzle 535, the seeds may bounce off of the firm ground, away from nozzle 535. Nozzle cover 710 helps catch and redirect seeds, helping the seeds to maintain their position in relatively orderly rows in the field. The exemplary embodiment 710 depicted in FIG. 7 is comprised of strands of flexible rubber hose 710a-c. However, nozzle covers 710 may take varying forms and be composed of varying materials, including but not limited to a hose, skirt, curtain, or cone that helps direct seed from nozzle 535.

The following Examples are only illustrative. It will be readily seen by one of ordinary skill in the art that the present invention fulfills the objectives set forth above. After reading the foregoing specification, one of ordinary skill will be able to effect various changes, substitutions of equivalents, and various other embodiments of the invention as broadly disclosed therein. It is therefore intended that the protection granted herein be limited only by the definition contained in the appended claims and equivalents thereof.

EXAMPLES

Figure 8:
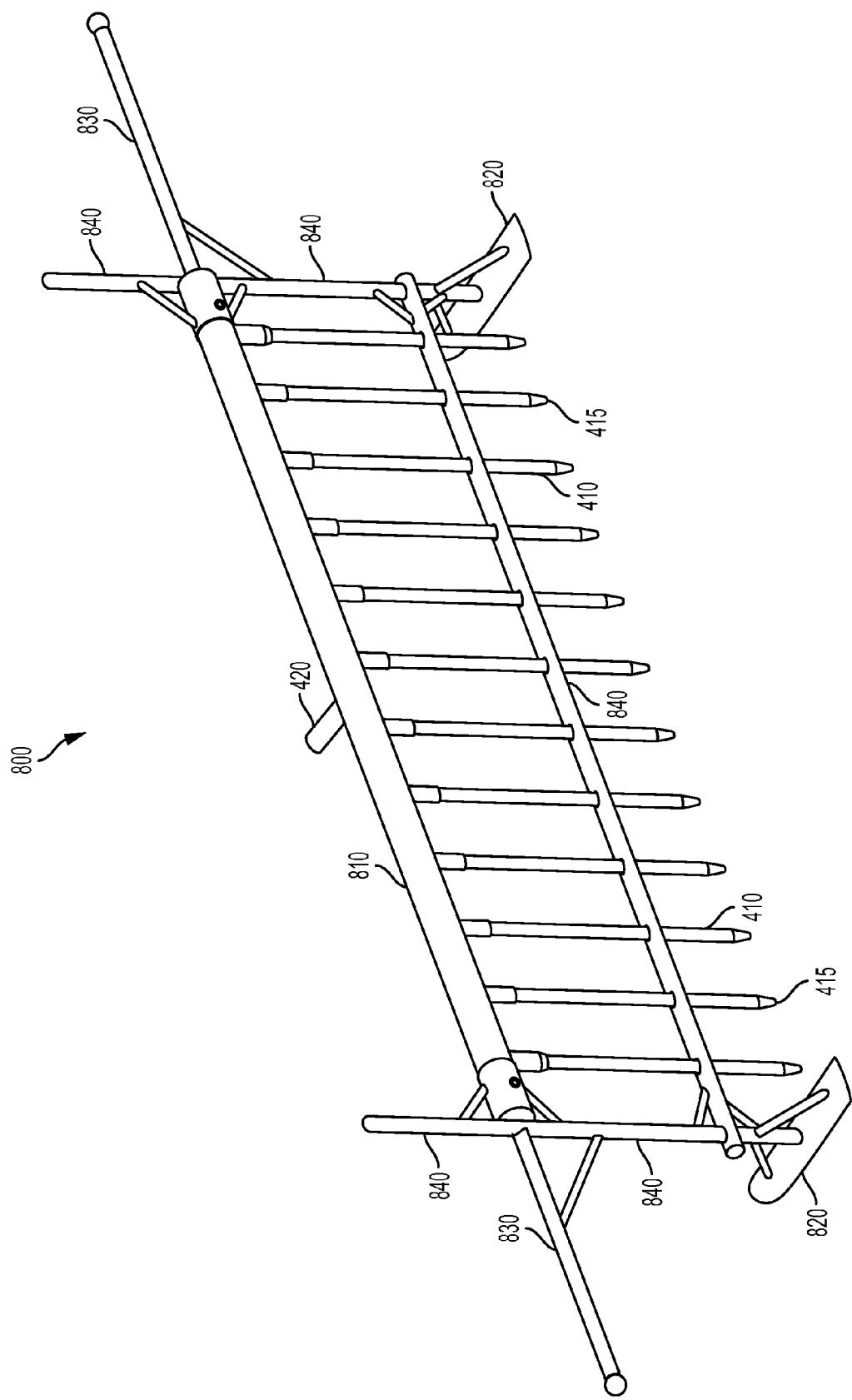
FIG. 8 depicts a perspective view of an exemplary device for planting seeds that comprises a frame for mounting and supporting a plurality of hollow vertical members, handles, and a pair of skis mounted to the frame.

FIG. 8 depicts an exemplary embodiment of a device 800 for planting seed. PVC T-connector 420 of device 800 can be attached, via a hose or other connector (not shown) to a broadcast planter or similar device for propelling seed and/or fertilizer. The T-connector 420 is attached to a set of horizontal PVC piping (not shown), which is enclosed by a piece of PVC pipe 810. The PVC pipe 810 comprises a slit along its length, which allows the PVC pipe 810 to be stretched to enclose and fit snugly around the horizontal PVC piping of device 800.

The exemplary device 800 features 12 vertical members 410, each comprised of PVC plastic and having a nozzle 415, and which are spaced equidistantly from each other and connected to the horizontal PVC piping encased within PVC pipe 810. The vertical members 410 are mounted onto metal frame 840, to which PVC pipe 810 is also attached. The frame 810 comprises two metal handles 830, which can be held by users and utilized to maneuver device 800 around a field for planting.

Device 800 also features two skis 820. The skis 820 are comprised of a metal, such as steel or aluminum, or a plastic, such as PVC. The device 800 slides on skis 820 as the users maneuver device 800 around a field, using handles 830, to plant seeds in neat, equidistant rows from the nozzles 415 of the vertical tubes 410 of device 800.

What is claimed is:

1. A device for planting seeds, comprising:
   a storage container;
   an air propulsion apparatus connected to the storage container;
   a first hollow member;
   a hollow horizontal member connected to the first hollow member; and
   a plurality of hollow vertical members connected to a bottom of the hollow horizontal member,
   wherein a first end of each of the plurality of hollow vertical members is connected to the bottom of the hollow horizontal member, and
   wherein the diameter of the first end of at least one of the plurality of hollow vertical members is equal to or less than a diameter of a midpoint of the at least one of the plurality of hollow vertical members, and the first end of the at least one of the plurality of hollow vertical members comprises: a) a baffle; and b) a notch.

2. The device of claim 1, wherein the storage container stores seeds.

3. The device of claim 2, wherein the storage container is capable of holding at least 10 kilograms of seeds.

4. The device of claim 2, wherein the storage container capable of holding at least 20 kilograms of seeds.

5. The device of claim 1, wherein the air propulsion apparatus is connected to the hollow horizontal member via the first hollow member.

6. The device of claim 1, wherein the first hollow member is a hose.

7. The device of claim 1, wherein the air propulsion apparatus is a broadcast planter.

8. The device of claim 7, wherein the broadcast planter is a gasoline-powered broadcast planter.

9. The device of claim 7, wherein the broadcast planter is an electric-powered broadcast planter.

10. The device of claim 9, the electric-powered broadcast planter comprises a battery.

11. The device of claim 1, wherein the hollow horizontal member comprises a plurality of pipes and flow reducers connected by T-connectors.

12. The device of claim 11, further comprising elbow connectors connected to a first and a second end of the hollow horizontal member, and a flow reducer connected to each of the elbow connectors.

13. The device of claim 12, wherein the plurality of pipes, fin reducers, T-connectors, and elbow connectors are comprised of PVC.

14. The device of claim 11, wherein a diameter of the hollow horizontal member at a center of the hollow horizontal member is greater than both: a) a diameter of the hollow horizontal member at a first end of the hollow horizontal member; and b) a diameter of the hollow horizontal member at a second end of the hollow horizontal member.

15. The device of claim 14, wherein the diameter of the hollow horizontal member at the first end is equal to the diameter of the hollow horizontal member at the second end.

16. The device of claim 1, wherein the first hollow member is connected to the hollow horizontal member by a T-connector at a center of the hollow horizontal member.

17. The device of claim 16, wherein the first hollow member is connected to the hollow horizontal member at a top of the hollow horizontal member.

18. The device of claim 16, wherein the T-connector comprises a protrusion that divides a perpendicular inlet of the T-connector in half.

19. The device of claim 18, wherein the protrusion comprises a sheet of material.

20. The device of claim 1, wherein the first end of each of the plurality of hollow vertical members is connected to the bottom of the hollow horizontal member by either a T-connector or an elbow connector.

21. The device of claim 20, wherein each of the plurality of hollow vertical members comprises a PVC pipe.

22. The device of claim 20, wherein a diameter of the first end of each of the plurality of hollow vertical members is larger than a diameter of a second end of each of the plurality of hollow vertical members.

23. The device of claim 20, wherein the first end of each of the plurality of hollow vertical members is located within the T-connector or elbow connector connecting the hollow vertical member to the hollow horizontal member.

24. The device of claim 20, wherein a diameter of the first end of the at least one hollow vertical member above the notch is smaller than a diameter of the first end of the at least one hollow vertical member below the notch.

25. The device of claim 24, wherein the hollow horizontal member is engaged with the notch in the first end of the at least one hollow vertical member.

26. The device of claim 22, wherein the second end of each of the plurality of hollow vertical members comprises a nozzle.

27. The device of claim 26, wherein the second end of each of plurality of hollow vertical members further comprises a nozzle cover.

28. The device of claim 27, wherein the nozzle cover comprises a flexible hose.

29. The device of claim 1, wherein the plurality of hollow vertical members comprises between 3 hollow vertical members and 30 hollow vertical members.

30. The device of claim 29, wherein the plurality of hollow vertical members comprises between 10 hollow vertical members and 20 hollow vertical members.

31. The device of claim 30, wherein the plurality of hollow vertical members comprises between 15 hollow vertical members and 17 hollow vertical members.

32. The device of claim 1, wherein the plurality of vertical members are evenly spaced along the hollow horizontal member.

33. A method for planting seeds, comprising:
    filling a storage container with seeds;
    emptying the seeds from the storage container into an air propulsion apparatus; and propelling the seeds through the air propulsion apparatus, through a first hollow member, through a horizontal hollow member, through a plurality of vertical hollow members, and into the ground, wherein a first end of at least one of the plurality of vertical hollow members comprises a half-pipe located inside the hollow horizontal member, and an equal volume of seeds is propelled into each of the plurality of vertical horizontal members.

34. The method of claim 33, comprising soaking the seeds in water for a period of time and then drying the seeds before filling the storage container with the seeds.

35. The method of claim 33, wherein a second end of each of the plurality of vertical hollow members comprises a nozzle, and the velocity of the seeds exiting the nozzle of the vertical hollow member is greater than or equal to the velocity of the seeds entering the first end of the vertical hollow member.

36. The method of claim 33, wherein filling the storage container with seeds comprises filling the storage container with both seeds and fertilizer.

37. The method of claim 36, wherein the fertilizer mixes with the seeds to create a mixture of seeds and fertilizer, and the mixture empties from the storage container into the air propulsion apparatus, which propels the mixture through the air propulsion apparatus, through the first hollow member, through the horizontal hollow member, and through the plurality of vertical hollow members and into the ground.

* * * * *